(12) United States Patent
Gadkaree et al.

(10) Patent No.: US 8,318,356 B2
(45) Date of Patent: Nov. 27, 2012

(54) ACTIVATED CARBON MATERIALS FOR HIGH ENERGY DENSITY ULTRACAPACITORS

(75) Inventors: Kishor Purushottam Gadkaree, Big Flats, NY (US); Joseph Frank Mach, Lindley, NY (US)

(73) Assignee: Corning Incorporated, Corning, NY (US)

( * ) Notice: Subject to any disclaimer, the term of this patent is extended or adjusted under 35 U.S.C. 154(b) by 272 days.

(21) Appl. No.: 12/335,044

(22) Filed: Dec. 15, 2008

(65) Prior Publication Data

US 2010/0151328 A1 Jun. 17, 2010

(51) Int. Cl.
*C01B 31/08* (2006.01)
(52) U.S. Cl. .................................... 429/231.8; 502/416
(58) Field of Classification Search ............... 429/231.8; 502/416
See application file for complete search history.

(56) References Cited

U.S. PATENT DOCUMENTS

| | | | | |
|---|---|---|---|---|
| 5,883,040 | A * | 3/1999 | Armstrong et al. ........... | 502/437 |
| 6,043,183 | A | 3/2000 | Alford ........................ | 502/180 |
| 6,060,424 | A | 5/2000 | Alford ........................ | 502/416 |
| 6,201,685 | B1 | 3/2001 | Jerabek et al. ............... | 361/502 |
| 6,212,062 | B1 | 4/2001 | Day et al. .................... | 361/502 |
| 6,225,733 | B1 | 5/2001 | Gadkaree et al. ............. | 313/352 |
| 6,304,426 | B1 | 10/2001 | Wei et al. ..................... | 361/502 |
| 6,487,066 | B1 | 11/2002 | Niiori et al. ................... | 361/502 |
| 6,565,701 | B1 | 5/2003 | Jerabek et al. ................ | 156/305 |
| 6,714,391 | B2 | 3/2004 | Wilk et al. ...................... | 361/15 |
| 6,738,252 | B2 | 5/2004 | Okamura et al. .............. | 361/502 |
| 2004/0085710 | A1 | 5/2004 | Takeuchi et al. .............. | 361/502 |
| 2005/0014643 | A1 | 1/2005 | Lini et al. ..................... | 502/432 |
| 2005/0221981 | A1 | 10/2005 | Wagh et al. .................... | 502/423 |
| 2006/0093915 | A1 | 5/2006 | Lundquist et al. ......... | 429/231.8 |
| 2007/0010666 | A1 | 1/2007 | Tajiri et al. ..................... | 536/127 |
| 2008/0003166 | A1 | 1/2008 | Maletin et al. ................ | 423/445 |
| 2008/0207442 | A1 | 8/2008 | Pfeifer et al. ................. | 502/416 |

FOREIGN PATENT DOCUMENTS

WO WO2007/114849 A2 10/2007
WO WO2008/049037 A2 4/2008

OTHER PUBLICATIONS

X. B. Zhao, et al "Hydrogen Adsorption on Activated Carbon" XP-002574152 Northern Carbon Research Laboratoires.
P. Taberna, et al "Activated carbon-carbon nanotube composite porous film for supercapacitor applications," Materials Research Bulletin 41 (2006) 478-484.

* cited by examiner

*Primary Examiner* — Stuart Hendrickson
(74) *Attorney, Agent, or Firm* — Michael W. Russell

(57) ABSTRACT

An activated carbon material derived, for example, by carbonizing and activating a non-lignocellulosic carbon precursor has a structural order ratio less than or equal to 0.08, and a nitrogen content greater than 0.2 wt. %. The activated carbon material can also have a volumetric capacitance greater than or equal to 70 F/cm$^3$, an area-specific resistance less than or equal to 0.1 ohm-cm$^2$ and/or a specific surface area greater than 300 m$^2$/g, and is suitable to form improved carbon-based electrodes for use in high energy density devices.

19 Claims, 6 Drawing Sheets

20.0μm 20.0μm

ACTIVATED CARBON MATERIALS FOR HIGH ENERGY DENSITY ULTRACAPACITORS

BACKGROUND AND SUMMARY

The present invention relates to carbon-based electrodes and, more specifically, to porous activated carbon material for use in such electrodes. The invention also relates to high power density energy storage devices comprising carbon-based electrodes.

Concerns over global warming, increased levels of $CO_2$ in the environment and the possible limitations of the world's petroleum reserves have prompted interest in developing low $CO_2$-emission technologies such as hybrid and electric vehicles. In this regard, rechargeable lithium ion batteries and electrochemical capacitors, which offer a potential for high performance at relatively low cost, are being considered as next-generation energy storage devices for such technologies, as well as for renewable energy sources such as solar and wind power.

Electrochemical capacitors, for instance, are also known as electrochemical double layer capacitors (EDLCs), ultracapacitors or supercapacitors. These energy storage devices typically comprise pairs of electrodes (e.g., carbon-based electrodes) separated by a porous separator in an organic electrolyte. Charge is stored electrostatically via reversible ion adsorption in the electrodes, which are electrically conductive, high surface area materials such as activated carbon. Because no redox reactions are involved in the charge storage mechanism, electrochemical capacitors can be charged and discharged rapidly and for millions of cycles.

An important characteristic of an ultracapacitor is the energy density that it can provide. The energy density is give as $E=\frac{1}{2}CV^2$, where C is capacitance of the electrode in Farads and V is the cell voltage. Thus, the energy density can be increased by increasing either the capacitance of the electrode or the cell voltage. In most electrochemical capacitors, however, the cell voltage is limited by electrolyte decomposition. For instance, with most organic electrolytes it is possible to achieve cell voltages of about 2.7 V. Based on this, the energy density can be most directly increased by increasing the capacitance of the electrode.

Although electrochemical capacitors are relatively simple in their design, their performance is largely determined by the properties of the electrodes that store the charge. Thus, there are numerous research efforts aimed at developing high capacitance, low cost materials for use in electrochemical capacitor electrodes. In addition to achieving a target capacitance, the optimization of additional properties such as pore size distribution, and electronic conductivity is desired. Control of surface functional groups and bulk impurities are also desired. For instance, pore size distribution should be optimized to give high capacitance and allow for fast ion diffusion. The electrical conductivity can be increased by tailoring the atomic structure and by using dopants such as nitrogen. The incorporation of surface functional groups can be used to promote electrolyte wetting, and impurities (especially transition metals) can be controlled to minimize Faradic reactions that could compromise long-term performance.

As can be inferred from the foregoing, electrode performance is not a function merely of surface area. Rather, in addition to the characteristics described above, accessible surface area is an important attribute for materials used in electrochemical cell electrodes.

Carbon-based electrodes suitable for incorporation into high energy density devices are known. For example, high performance carbon materials, which form the basis of such electrodes, can be made from synthetic phenolic resin precursors. However, due to the high cost of the synthetic resins, the cost of such carbon-based electrodes can be high. Accordingly, it would be an advantage to provide a more economical carbon material that can be used to form carbon-based electrodes that enable higher energy density devices.

One aspect of the invention is an activated carbon material that is suitable for incorporation into carbon-based electrodes for use in ultracapacitors and other high power density energy storage devices. Such a material may be derived, for example, via carbonization and activation of natural non-lignocellulosic materials. By using non-lignocellulosic materials as a precursor for the porous, activated carbon material, economically viable, high power, high energy density devices can be formed. As defined herein, unless expressly defined otherwise, "natural, non-lignocellulosic carbon precursor" means at least one natural, non-lignocellulosic carbon precursor. Likewise, for example, reference to an "inorganic compound" means at least one inorganic compound.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Figure 1:
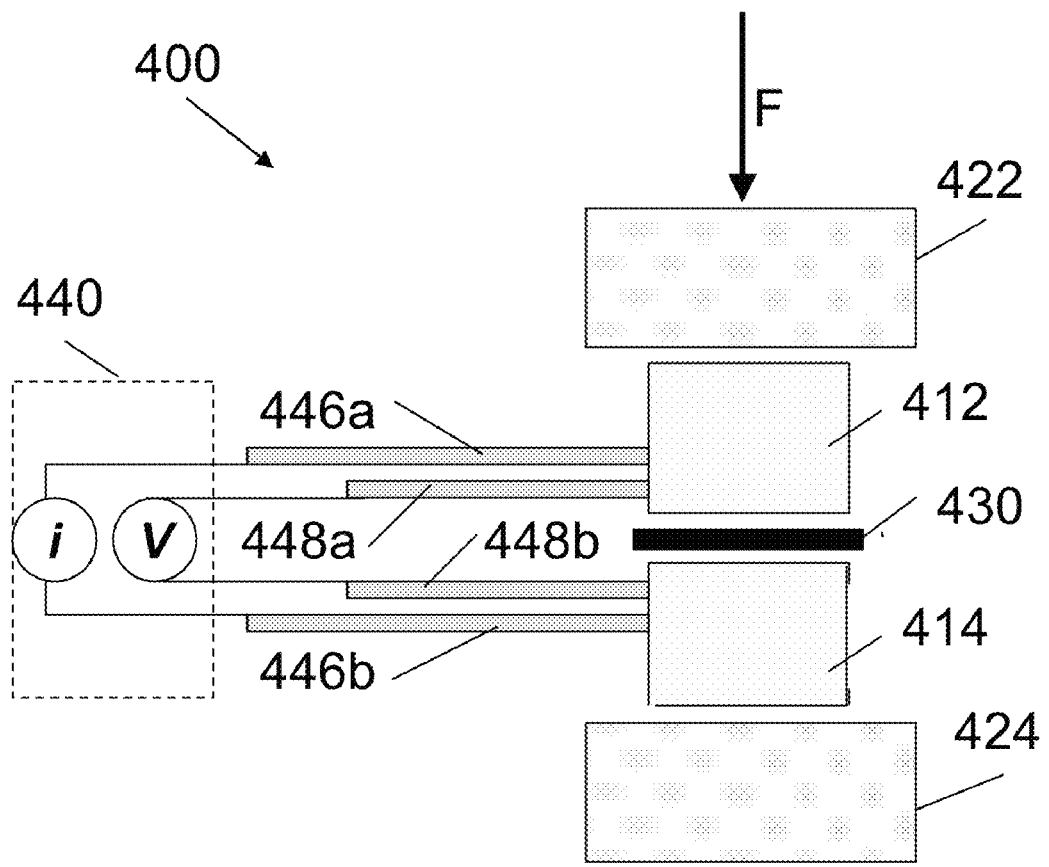
FIG. 1 is a schematic illustration of a testing apparatus used to measure electrical resistance of free-standing carbon electrodes according to an embodiment.

In one embodiment, an activated carbon material derived, for example, by carbonizing and activating a non-lignocellulosic carbon precursor, has a structural order ratio less than or equal to 0.08, and a nitrogen content greater than 0.2 wt. %. The activated carbon material can also have a specific surface area greater than or equal to 300 $m^2/g$, and is suitable to form improved carbon-based electrodes for use in high energy density devices. When incorporated into a carbon-based electrode, the activated carbon material can have a volumetric capacitance greater than or equal to 70 $F/cm^3$ and/or an area-specific resistance less than or equal to 0.1 ohm-$cm^2$.

Carbon-based electrodes comprising the activated carbon material may further include at least one additive such as a binder or an electrically conductive carbon material. The carbon-based electrodes can be formed on an electrically conductive substrate (e.g., current collector) and incorporated into an electrochemical cell.

A method for producing such an activated carbon material comprises, for example, forming an aqueous mixture of a natural, non-lignocellulosic carbon precursor and an inorganic compound, heating the aqueous mixture in an inert or reducing atmosphere to carbonize the carbon precursor, and removing the inorganic compound from the carbonized carbon precursor.

A further method for producing such an activated carbon material comprises heating a natural, non-lignocellulosic carbon precursor in an inert or reducing atmosphere to form a first carbon material, mixing the first carbon material with an inorganic compound to form a mixture, heating the mixture to incorporate the inorganic compound into the first carbon material, and removing the inorganic compound from the first carbon material. Advantageously, the step of mixing can comprise mixing the first carbon material with an aqueous mixture of the inorganic compound.

During the mixing, the inorganic compound can be incorporated into the structure of the natural, non-lignocellulosic carbon precursor or of the first carbon material. In order to facilitate mixing, the inorganic compound can be initially dissolved in a solvent such as water. In this approach, the solution of the inorganic compound is mixed with the natural, non-lignocellulosic carbon precursor or the first carbon material, and the mixture is allowed to age for an amount of time effective to permit incorporation of the inorganic compound into the natural, non-lignocellulosic carbon precursor or the first carbon material. The mixture can be aged for 0.5, 1, 2, 4, 8 or more hours (e.g., from 0.5 to 8 hours).

The non-lignocellulosic carbon precursor and the inorganic compound can be combined in any suitable ratio. A ratio, expressed in weight percent, of natural, non-lignocellulosic carbon precursor to inorganic compound can range from about 10:1 to 1:10. Non-limiting, exemplary ratios include 9:1, 8:1, 7:1, 6:1, 5:1 4:1, 3:1, 2:1, 1:1, 1:2, 1:3, 1:4, 1:5, 1:6, 1:7, 1:8 and 1:9. According to one embodiment, the ratio of inorganic compound to natural, non-lignocellulosic carbon precursor is greater than or equal to 1 (e.g., 10:1, 9;1, 8:1, 7:1, 6:1, 5:1, 4:1, 3:1, 2:1 or 1:1).

Similarly, the first carbon material and inorganic compound can be combined in any suitable ratio. A ratio, expressed in weight percent, of natural, non-lignocellulosic carbon precursor to inorganic compound can range from about 10:1 to 1:10 (e.g., 9:1, 8:1, 7:1, 6:1, 5:14:1, 3:1, 2:1, 1:1, 1:2, 1:3, 1:4, 1:5, 1:6, 1:7, 1:8 or 1:9).

In embodiments where the inorganic compound is incorporated into the natural, non-lignocellulosic carbon precursor, the (optionally aged) mixture is heated at a temperature effective to carbonize the carbon precursor. Preferably, the mixture is heated in an inert or reducing atmosphere. The mixture can be heated at a temperature from about 600° C. to 900° C. (e.g., 600, 650, 700, 750, 800, 850 or 900° C.) for a predetermined time (e.g., 0.5, 1, 2, 4, 8 or more hours) and then cooled. During the heating step, the natural, non-lignocellulosic carbon precursor decomposes and forms carbon.

In embodiments where the inorganic compound is incorporated into the first carbon material, the mixture is heated at a temperature effective to incorporate the inorganic compound into the first carbon material. The mixture can be heated at a temperature from about 300° C. to 850° C. for a predetermined time (e.g., 0.5, 1, 2, 4, 8, or more hours) and then cooled.

After cooling, the carbon material with the inorganic compound incorporated therein is rinsed in a solvent to remove the inorganic compound. A preferred solvent for extracting the inorganic compound is water. Optionally, the extraction solvent can include an acid. One process for removing the inorganic compound involves sequentially rinsing the carbon material with water and acid. A further process for removing the inorganic compound involves rinsing the carbon material with an aqueous acid mixture (e.g., mixture of acid and water). Acids used during the extraction can include hydrochloric acid. The process of extracting the inorganic compound forms a porous, activated carbon material, the pores being defined by the volume previously filled by the inorganic compound. The invention also relates to the porous activated carbon material made according to any one of the foregoing methods.

Carbon-based electrodes can be made using the activated carbon material according to the present invention. A method for producing a carbon-based electrode comprises forming an aqueous mixture of a natural, non-lignocellulosic carbon precursor and an inorganic compound, heating the aqueous mixture in an inert or reducing atmosphere to carbonize the carbon precursor, removing the inorganic compound from the carbonized precursor, and forming a carbon-based electrode from the resulting porous, activated carbon material.

A further method for producing a carbon-based electrode comprises heating a natural, non-lignocellulosic carbon precursor in an inert or reducing atmosphere to form a first carbon material, mixing the first carbon material with an inorganic compound to form a mixture, heating the mixture to incorporate the inorganic compound into the first carbon material, removing the inorganic compound from the first carbon material to produce a porous, activated carbon material, and forming a carbon-based electrode from the porous, activated carbon material.

A still further method for producing a carbon-based electrode comprises heating a natural, non-lignocellulosic carbon precursor in an inert or reducing atmosphere to form an intermediate carbon material, heating the intermediate carbon material in an oxidizing atmosphere, and forming a carbon-based electrode from the resulting porous, activated carbon material. Carbon material formed by either method may be ground to a finer particle size before forming an electrode.

Optionally, in conjunction with the foregoing methods for producing a carbon-based electrode, the porous activated carbon material can be mixed with carbon black and/or a polymeric binder such as polytetrafluroethylene (PTFE) or other suitable binder and compacted to form the carbon-based electrode.

By way of example, a carbon paper having a thickness in the range of about 100-300 microns can be prepared by rolling and pressing a powder mixture comprising 60-90 wt. % activated carbon material, 5-20 wt. % carbon black and 5-20 wt. % PTFE. Carbon sheets can be stamped or otherwise patterned from the carbon paper and laminated to a conductive current collector to form a carbon-based electrode.

The high energy density device can include an ultracapacitor. Ultracapacitors can have a jelly roll design, prismatic design, honeycomb design, or other suitable configuration. A carbon-based electrode made according to the present invention can be incorporated into a carbon-carbon ultracapacitor or into a hybrid ultracapacitor. In a carbon-carbon ultracapacitor, both of the electrodes are carbon-based electrodes. In a hybrid ultracapacitor, on the other hand, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

Advantageously, ultracapacitors made using the inventive carbon-based electrodes exhibit energy densities that are greater than (e.g., more than 10, 20, 30, 40 or 50%) the energy densities of ultracapacitors made using electrodes derived from commercially-available carbon material.

The inorganic compound used in accordance with the present invention can include an alkali hydroxide or chloride (e.g., NaOH, KOH, NaCl, KCl), phosphoric acid, or other suitable salt such as $CaCl_2$ or $ZnCl_2$.

The carbon precursor can be a non-lignocellulosic material. As defined herein, a substance that contains both cellulose and lignin is lignocellulosic and, for example, can include any of several closely-related substances constituting the essential part of woody cell walls of plants having cellulose intimately associated with lignin. The non-lignocellulosic carbon precursors used in conjunction with the present invention are substantially free of at least one of lignin and cellulose. By substantially free is meant that at least one of the lignin and cellulose comprise, for example, at most 0.5, 1 or 2 wt. % of the composition of the carbon precursor.

In one embodiment, the natural non-lignocellulosic carbon precursor contains cellulose and is substantially free of lignin. In a further embodiment, the natural non-lignocellulosic carbon precursor contains lignin but is substantially free of cellulose. In a still further embodiment, the natural non-lignocellulosic carbon precursor is substantially free of both lignin and cellulose. The natural, non-lignocellulosic carbon precursor is not a synthetic material such as a synthetic resin.

Lignin, which is a Latin word for wood, is a compound that imparts rigidity to a plant. Lignin is a three-dimensional polymer having an amorphous structure and a high molecular weight. Of the three main constituents in plant fibers, lignin has the least affinity for water. In addition, lignin is a thermoplastic (i.e., lignin starts to soften at relatively low temperature and, with increasing temperature, will flow readily).

Cellulose is a basic structural component of plant fibers. Cellulose molecules can comprise, e.g., glucose units that are linked together in long chains, which in turn are linked together in bundles called microfibrils. Hemicelluloses are also found in plant fibers. Hemicelluloses are typically polysaccharides bonded together in relatively short, branching chains. Hemicelluloses, which are usually hydrophilic, are usually intimately associated with the cellulose microfibrils, embedding the cellulose in a matrix.

Typical lignocellulosic fibers from agriculture are found, for example, in straws, hemp, flax, sisal, jute, coconut shell flour, wood flour, etc. On the other hand, non-lignocellulosic fibers are substantially free of lignin and/or cellulose.

The natural, non-lignocellulosic carbon precursor can be derived from an edible grain such as wheat flour, walnut flour, corn flour, corn starch, rice flour, and potato flour. Other natural, non-lignocellulosic carbon precursors include beets, millet, soybean, barley, and cotton. The non-lignocellulosic material can be derived from a crop or plant that may or may not be genetically-engineered.

An exemplary non-lignocellulosic carbon precursor is wheat flour. Wheat flour is derived by milling wheat kernels, which are the seeds of the wheat plant. Wheat kernels have three main parts: the endosperm, the germ, and the bran. Whole wheat flour contains all three parts of the kernel, while white flour is milled from just the endosperm.

Compositionally, white flour contains mostly starch, although additional components are naturally present. The main components in white flour, with approximate percentages provided in parentheses, are starch (68-76%), proteins (6-18%), moisture (11-14%), gums (2-3%), lipids (1-1.5%), ash (<0.5%) and sugars (<0.5%).

Starch makes up the bulk of white flour. Even bread flour, considered "low" in starch, contains more starch than all other components combined. Starch is typically present in flour as small grains or granules. Chunks of protein bind starch granules together and hold them in place within the endosperm. Glutenin and gliadin, the gluten-forming proteins, typically make up about 80 percent of the proteins in the endosperm. Other proteins in white flour include enzymes, such as amylase, protease, and lipase. Other carbohydrates in flour besides starch include gums, specifically pentosan gums. Pentosan gums are a source of soluble dietary fiber. Lipids include oils and emulsifiers, and ash includes inorganic matter (mineral salts), which can comprise iron, copper, potassium, sodium, and zinc.

In a typical electric double layer capacitor (EDLC), a pair of carbon-based electrodes is separated by a porous separator and the electrode/separator/electrode stack is infiltrated with a liquid organic or inorganic electrolyte. The electrodes comprise activated carbon powder that has been mixed with other additives (e.g., binders) and compacted into a thin sheet and laminated to a conductive metal current collector backing.

During use, an electric double layer can form via the stored charge that accumulates on opposing electrodes. The amount of charge stored in the electric double layer impacts the achievable energy density and power density of the capacitor.

The performance (energy and power density) of an ultracapacitor depends largely on the properties of the activated carbon material that makes up the electrodes. The properties of the activated carbon material, in turn, can be gauged by evaluating the structural order of the carbon atoms, the porosity and pore size distribution of the material, the nitrogen content, and the electrical properties of the activated carbon material when incorporated into a carbon-based electrode. Relevant electrical properties include the area-specific resistance and the volumetric capacitance.

The carbon structural order can be determined from powder samples using low angle X-ray diffraction (XRD). To prepare samples for XRD, powdered material is lightly ground in an agate mortar and pestle, and the ground sample is pressed into a Bruker-AXS powder sample holder. X-ray diffraction results were obtained using copper $K_\alpha$ radiation (1.5406 Å) on a Bruker-AXS D4 Endeavor X-ray diffractometer over a 2-theta angular range of 0.5-20 degrees with a step size of 0.02 degrees and a dwell time of 1 second.

The carbon structural ratio is computed as a normalized intensity of the X-ray reflection at 60 Angstroms. Specifically, the intensity of the diffracted beam at a d-spacing of 60 Angstroms ($I_{60}$) is divided by the positive difference between the intensity at a d-spacing of 176 Angstroms ($I_{176}$) and the intensity at a d-spacing of 15 Angstroms ($I_{15}$). Thus, the carbon structural order ratio is defined herein as $SOR=I_{60}/(I_{176}-I_{15})$.

Electrical properties of activated carbon materials can be evaluated by measuring the characteristics of carbon-based electrodes. The carbon-based electrodes evaluated herein include 85 wt. % activated carbon material, 5 wt. % conductive carbon (e.g., Black Pearls®, which is marketed by Cabot Corporation, Boston, Mass.), and 10 wt. % Teflon® (PTFE).

The through-plane electrical resistance of free-standing carbon electrodes is measured using the testing apparatus 400 shown schematically in FIG. 1. The testing apparatus 400 includes two ceramic disks 412, 414 each having a 1 inch diameter and covered with a 25 μm thick silver foil. The ceramic disks 412, 414 are mounted on an Instron® Electromechanical Test System (Model 4202) having upper and lower platens 422, 424. By applying a force F to the upper platen 422, a pre-determined load can be applied to a sample 430 via the ceramic disks 412, 414.

Each carbon electrode 430 to be tested measures 1.1 inches in diameter and is centered between the ceramic disks 412, 414. The silver foils are connected to a digital multimeter (Model 2700, Keithley Instruments) 440 in a standard four-wire configuration. A load of 100 lbs is applied to the carbon electrode and the multimeter 440 applies a current (i) of known magnitude to the outer two leads 446a and 446b and measures the resulting voltage (V) between the inner two leads 448a and 448b.

The measured voltage is converted to resistance. A background resistance, which corresponds to the resistance between the silver foils without any sample, is subtracted from the measured resistance. The multimeter can measure resistances with a resolution of 1 $\mu\Omega$. Reported values represent the average of measurements from at least three different samples of the same electrode material.

The measured resistance of each electrode (R, in $\Omega$) can be correlated to the resistivity of the electrode material ($\rho p$, in $\Omega$cm), thickness of the electrode (l, in cm) and the geometric area of the electrode in contact with the silver foil (A, in cm$^2$) according to the known relationship:

$$R = \rho \frac{l}{A} \tag{1}$$

The area-specific resistance ($R_{sp}$, in $\Omega$-cm$^2$) of the electrode is then given by:

$$R_{sp} = R \times A \tag{2}$$

Figure 2:
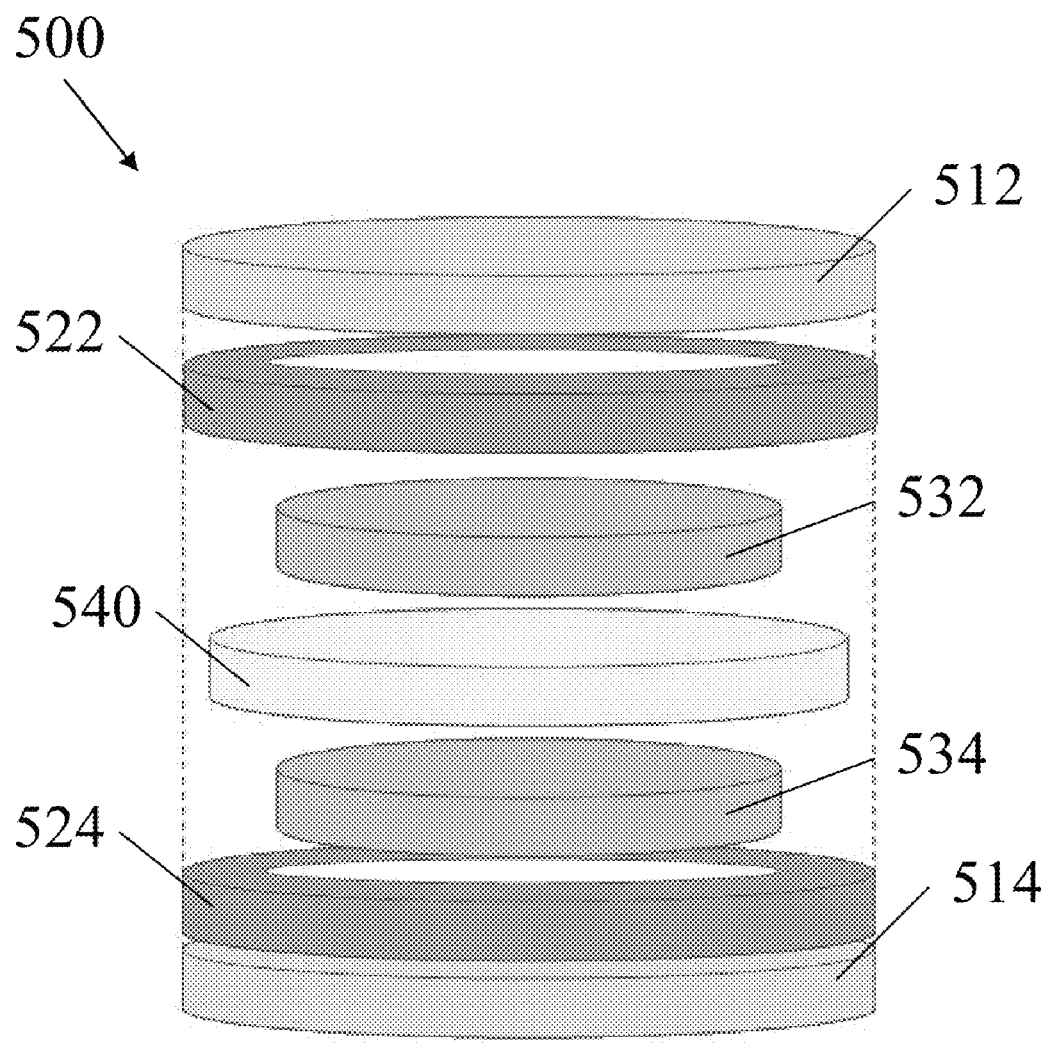
FIG. 2 is a schematic illustration of a button cell capacitor.

As with the area-specific resistance, the volumetric capacitance of the activated carbon material can be measured by forming the material into a carbon-based electrode. With reference to FIG. 2, a button cell 500 was formed by punching carbon electrodes 532, 534 having a diameter of 0.625 inches from sheets of the electrode material. A separator 540 is placed between identical carbon electrodes 532, 534, which, in turn, are sandwiched between two conductive carbon-coated aluminum current collectors 512, 514. A thermoset polymer ring 522, 524 is formed around the periphery of the carbon electrodes 532, 534 to seal the cell 500, which is filled with an organic electrolyte such as 1.5M tetraethylammonium-tetrafluoroborate (TEA-TFB) in acetonitrile.

According to a further embodiment, an electrochemical cell comprises a first electrode comprising an activated carbon material, a porous separator, and a pair of electrically conductive substrates, wherein the porous separator is disposed between the first electrode and a second electrode, and the first and second electrodes are each in electrical contact with a respective electrically conductive substrate.

The capacitance of the cell ($C_{cell}$) is measured from galvanostatic discharge. The cell is first charged at a constant current ($i_{charge}$) to a desired potential (e.g., 2.7 V), which is followed by a constant current discharge ($i_{discharge}$). According to Ohm's law, capacitor current (i) is proportional to the time derivative of capacitor voltage according to:

$$i = C \frac{dV}{dt} \tag{3}$$

where C is capacitance, V is the cell voltage (in Volts) and t is time (in seconds).

By measuring the slope from the galvanostatic discharge curve (cell voltage vs. time), the cell capacitance (in Farads) can then be calculated as:

$$C_{cell} = \frac{i_{discharge}}{dV/dt} \tag{4}$$

The cell capacitance is the harmonic sum of two individual capacitances represented by the electrochemical double layer capacitance of each of the carbon electrodes (capacitors in series). This relationship can be expressed as:

$$\frac{1}{C_{cell}} = \frac{1}{C_1} + \frac{1}{C_2} \tag{5}$$

where $C_1$ and $C_2$ are the double layer capacitances of the individual carbon electrodes 532, 534 in cell 500.

The magnitudes of these capacitances can be correlated to the volumetric specific capacitance of the carbon electrodes as:

$$C_1 = C_{sp,1} \times V_1 \tag{6}$$

$$C_2 = C_{sp,2} \times V_2 \tag{7}$$

where $C_{sp,1}$ and $C_{sp,2}$ are specific capacitances of the individual carbon electrodes (in F/cm$^3$) and $V_1$ and $V_2$ are the corresponding electrode volumes. Because the test cell uses electrodes having identical size and composition, $C_1=C_2$, $C_{sp,1}=C_{sp,2}(=C_{sp})$ and $V_1=V_2(=V_{total}/2$, where $V_{total}$ is the total volume (cm$^3$) of carbon electrodes in the cell). Equations (5), (6) and (7) can now be combined to give a volumetric capacitance, $C_{sp}$ as:

$$\frac{1}{C_{cell}} = \frac{2}{C_{sp} \times V_{total}} + \frac{2}{C_{sp} \times V_{total}} \tag{8}$$

or, $$C_{sp} = \frac{4 \times C_{cell}}{V_{total}} \tag{9}$$

The nitrogen content (wt. %) of select samples was determined using a Thermo Flash analyzer. The technique is the classical Dumas method, which uses thermal conductivity detection (TCD), and is described by ASTM D5373 and ASTM D5291.

Weighed samples are combusted in oxygen at 950° C. The combustion products (including N$_2$ and NO$_x$) are swept with a helium carrier gas through combustion catalysts, scrubbers, and through a tube filled with reduced copper. The copper removes excess oxygen and reduces NO$_x$ to N$_2$. The N$_2$ is then separated from other gases on a chromatography column and measured with TCD.

The carbon material can have a specific surface area greater than about 300 m$^2$/g, i.e., greater than 350, 400, 500 or 1000 m$^2$/g.

EXAMPLES

The invention will be further clarified by the following examples:

Example 1

Wheat flour was first carbonized in flowing nitrogen at 800° C. for 2 hours. The resulting carbonized precursor was then mixed with a KOH solution (46 wt. % in water) in 1:5 (wt./wt.) ratio of carbon:KOH. The mixture was heated in nitrogen to 800° C. for 2 hours and cooled to room temperature. The cooled mixture was washed with water and then with dilute HCl to remove potassium. Complete elimination of potassium was confirmed by monitoring the pH of the effluent. The carbon powder product was dried and ground to a fine powder (~10 micrometers).

Eighty grams of the carbon powder was mixed with 10 grams of carbon black and 10 grams of PTFE to obtain a well-mixed mass. This mixture was then rolled on a roll mill to obtain a well-knit film having a thickness of about 100 micrometers. Carbon-based electrodes were produced by stamping the thin film.

The carbon-based electrodes were soaked in 1.5 M tetra-ethylammonium-tetrafluoroborate (TEA-TFB) in acetonitrile. A porous separator was also soaked in the electrolyte solution and an electrode/separator/electrode stack was assembled into a button cell with opposing aluminum current collectors. Standard voltametric as well galvanostatic tests were carried out to measure the performance of the cell. The volumetric capacitance of the activated carbon electrode was 96 F/cm$^3$.

Example 2

The experiment of Example 1 was repeated, except corn flour was substituted for wheat flour. The volumetric capacitance of the activated carbon electrode was 97 F/cm$^3$.

Example 3 (Comparative)

A comparative, resin-based carbon material was prepared by combining an aqueous solution of KOH (45 wt. %) with an aqueous phenolic resin (Georgia Pacific GP® 510D34) in a ratio of 3:1 by weight. The mixture was cured by heating in an oven at 125° C. for 24 hours and then at 175° C. for 24 hours to obtain a foam-like solid with a brown-yellow color. The cured mixture was broken into small pieces by mechanical force, placed in a graphite crucible and loaded in a retort furnace (CM Furnaces, Model 1216FL) for carbonization/activation.

The furnace temperature was ramped up at a rate of 200° C./hr to 800° C., held at 800° C. for 2 hours, and then cooled down naturally. Throughout the heating cycle, the furnace was purged with nitrogen gas.

After cooling to ambient temperature, the carbon material was soaked in DI water for a few minutes, filtered, soaked in a known amount of 37% HCl solution (2 mL for every 1 g of carbon) for an hour, filtered, and then washed repeatedly with DI water until the pH of the effluent was the same as that of DI source. The carbon was finally dried at 110° C. in a vacuum oven overnight and then ground to a desired particle size.

The volumetric capacitance measured using the procedure set forth in example 1 was 105 F/cm$^3$.

Example 4 (Comparative)

Figure 3A:
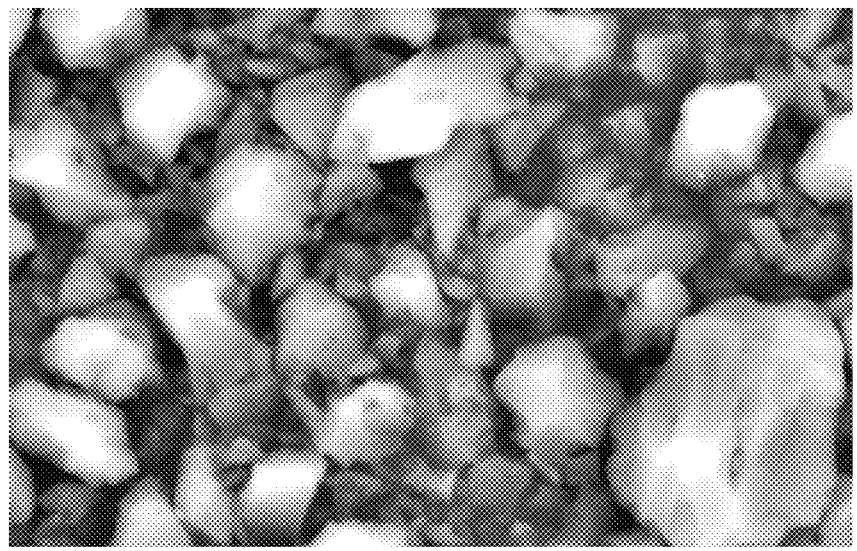
FIGS. 3A and 3B are SEM micrographs showing comparative carbon material derived from a lignocellulosic carbon precursor.
Figure 3B:

A commercially-available PICA carbon (derived from lignocellulosic materials), which was developed for use in ultracapacitor applications, was substituted for the inventive carbon material and was tested using the button-cell procedure described in example 1. The volumetric capacitance was 45 F/cm$^3$. FIGS. 3A and 3B show SEM micrographs of this material, which has a block-like granular structure. The BET surface area was 1800 m$^2$/g.

Example 5 (Comparative)

A further commercially-available Kuraray carbon—YP50 (derived from lignocellulosic materials) was also characterized using the button cell procedure according to example 1. The volumetric capacitance was 65 F/cm$^3$.

Example 6

Wheat flour was mixed with a KOH solution (46 wt. % in water) to obtain a 1:3 ratio (wt./wt.) of flour:KOH. The mixture was allowed to age for 1 hour to allow incorporation of the KOH into the wheat flour structure. The mixture was then placed into a controlled atmosphere furnace, heated under flowing nitrogen to 800° C. for 4 hours, and cooled in nitrogen to room temperature.

After cooling, the mixture was washed initially with water and then with dilute HCl to remove potassium. Complete elimination of potassium was confirmed by monitoring the pH of the effluent. The carbon material was dried and ground to a fine (10 micrometer) powder.

Figure 4:
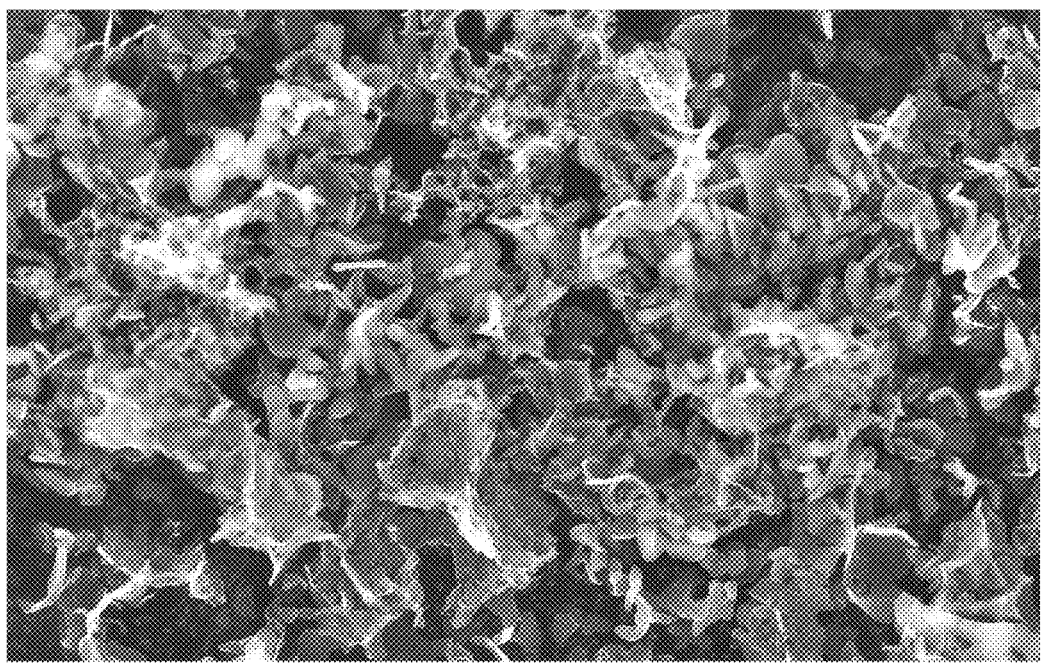
FIG. 4 is an SEM micrograph showing inventive carbon material derived from a natural, non-lignocellulosic carbon precursor.

An SEM micrograph of the carbon material is shown in FIG. 4. In contrast to the comparative PICA carbon of example 4, this inventive carbon comprises flakes of carbon material. It is believed that this structure facilitates packing of the carbon material during electrode fabrication.

A button cell was assembled according to the procedure of example 1. The volumetric capacitance was 95 F/cm$^3$.

Example 7—(Comparative)

The experiment of Example 6 was repeated, except walnut shell flour was substituted for wheat flour. The volumetric capacitance was 59 F/cm$^3$. This example shows lower volumetric capacitance achieved with a lignocellulosic precursor.

Example 8

The experiment of Example 6 was repeated with corn flour, except the flour:KOH ratio was 1:5 and the sample was heated in a furnace set to 700° C.

Example 9

The experiment of Example 6 was repeated with rice flour. The carbon was mixed with binder and electrodes were fabricated according to the procedure described in example 1. The volumetric capacitance was 80 F/cm$^3$.

Example 10

The experiment of Example 6 was repeated, except the wheat flour to KOH ratio was changed to 1:1. The carbon was mixed with binder and electrodes were fabricated as described in example 1. The volumetric capacitance was 88 F/cm$^3$.

Example 11

Wheat flour was first carbonized in nitrogen at 800° C. in nitrogen for 4 hours. The carbonized precursor material obtained was mixed with a KOH solution (46 wt. % in water) in 1:3 (wt./wt.) ratio of carbon:KOH. The mixture was then heated in nitrogen to 800° C. for 4 hours and allowed to cool in nitrogen to room temperature. After cooling, the mixture was washed with water and finally with dilute HCl to remove potassium. Complete elimination of potassium was confirmed by monitoring the pH of the effluent. The carbon was then dried and ground to a fine powder (~10 micrometers), mixed with binder, and electrodes were fabricated as described in example 1. The volumetric capacitance was 94 F/cm$^3$.

Example 12

The experiment of example 11 was repeated with corn flour. The carbon was mixed with binder and electrodes were fabricated as described in example 1. The volumetric capacitance was 91 F/cm$^3$.

Example 13

Wheat flour was first carbonized in nitrogen to 850° C., followed by activation in carbon dioxide. The carbon thus obtained was mixed with binder and electrodes were fabricated as described in example 1. The volumetric capacitance was 80 F/cm$^3$.

Figure 5A:
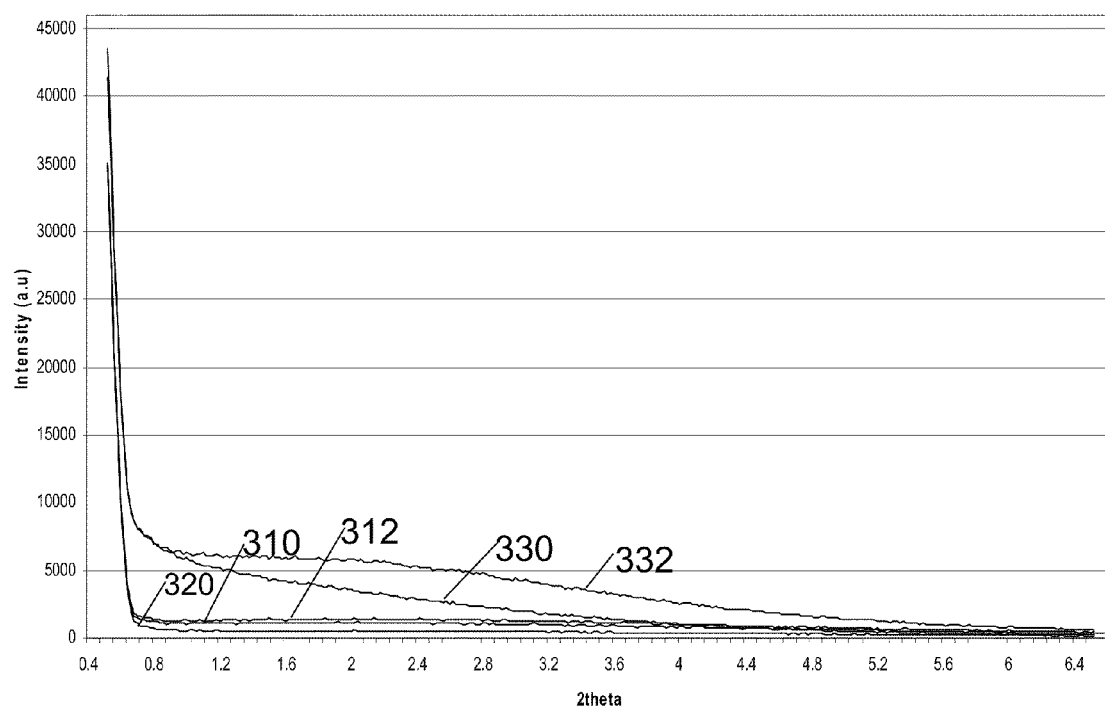
FIGS. 5A and 5B are low angle X-ray diffraction scans for various activated carbon materials.
Figure 5B:
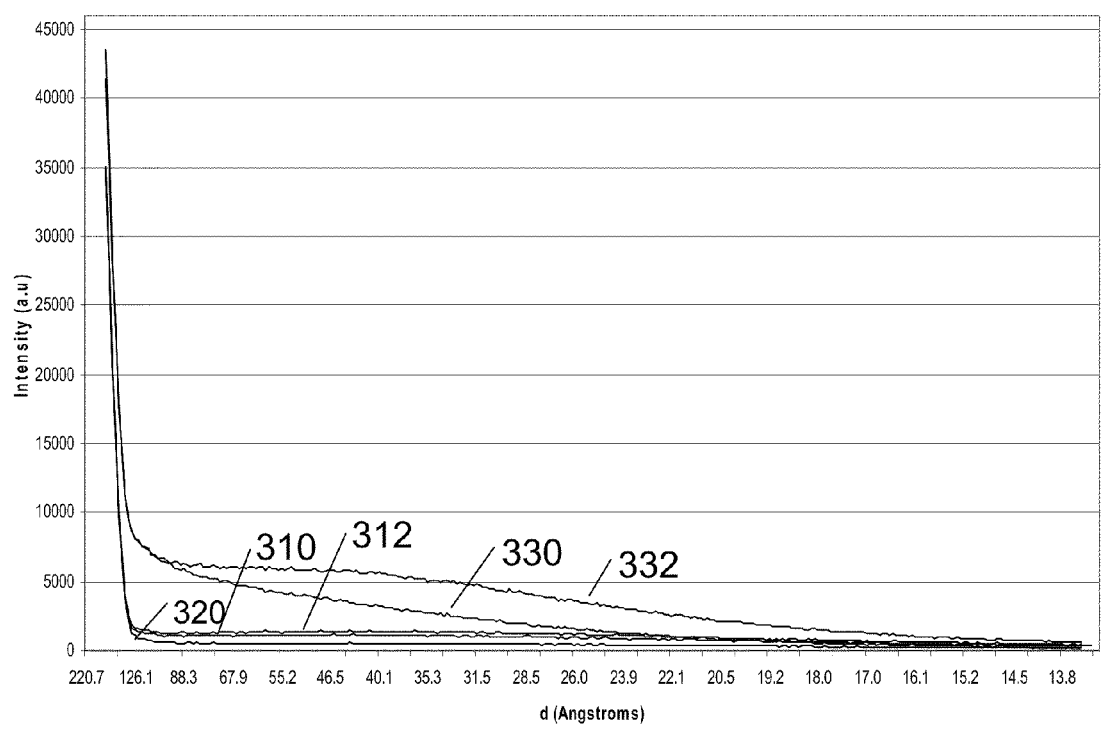

X-ray diffraction curves for both non-lignocellulosic precursor derived activated carbon according to embodiments of the invention, and comparative resin-based and lignocellulosic (coconut shell)-based carbon are shown in FIGS. 5A-5B. FIG. 5A is a plot of X-ray intensity versus 2-theta, and FIG. 5B is the corresponding plot versus d-spacing.

In FIGS. 5A and 5B, curves 310 and 312 correspond to non-lignocellulosic (wheat flour and corn flour, respectively)-derived activated carbon according to embodiments of the present invention. Specifically, curve 310 represents a wheat flour-derived activated carbon that corresponds to the material of Example 1, and curve 312 represents a corn flour-derived activated carbon that corresponds to the material of Example 2.

Curves 320, 330 and 332 correspond to comparative activated carbon. Curve 320 represents a resin-derived activated carbon that corresponds to the material of comparative Example 3. Curves 330 and 332 correspond to commercially-available PICA activated carbon and Kuraray YP-50 activated carbon of examples 4 and 5, respectively. The Kuraray YP-50 and PICA materials are lignocellulosic (coconut shell)-derived activated carbons.

As can be seen by referring to FIGS. 5A and 5B, comparative, commercially-available PICA activated carbon and Kuraray YP-50 activated carbon materials display one or more prominent low angle reflections that are consistent with domain and sub-domain crystalline order, while the non-lignocellulosic activated carbons are substantially free of such reflections. This effect, which is associated with the absence low angle crystalline order, is quantified in terms of the carbon structural order ratio, which was defined above.

A summary of structural order ratio, electrical data and compositional data is given in Table 1. According to an embodiment, an activated carbon material can have a structural order ratio less than or equal to 0.08 and a nitrogen content greater than 0.2 wt. %. In further embodiments, the activated carbon material can have a structural order ratio less than or equal to 0.07, 0.06, 0.05, 0.04, 0.03, 0.02 or 0.01. A carbon-based electrode comprising activated carbon material can have an area-specific resistance less than or equal to 0.1 ohm-cm$^2$ (e.g., less than or equal to 0.09, 0.08, 0.07, 0.06, 0.05, 0.04, 0.03, 0.02 or 0.01 ohm-cm$^2$). Further, carbon-based electrode according to the invention can have a volumetric capacitance greater than or equal to 70 F/cm$^3$ (e.g., greater than or equal to 75, 80, 85, 90 or 95 F/cm$^3$).

As shown in Table 1, activated carbon materials derived from non-lignocellulosic precursors have a nitrogen content that is greater than the nitrogen content of resin-derived activated carbon. The activated carbon material according to the invention can have a nitrogen content greater than 0.2 wt. % and as high as, for example, about 5 wt. % (e.g., greater than 0.2, 0.5, 1, 1.5, 2, 2.5, 3, 3.5, 4 or 4.5 wt. %).

Without wishing to be bound by theory, the incorporation of nitrogen into activated carbon is believed to decrease resistance and increase capacitance, and thus improve the efficacy of such activated carbon when used in the form of carbon-based electrodes in electrochemical cells such as EDLCs. Nitrogen is incorporated into the inventive carbon material during carbonization/activation and advantageously without the need for additional processing steps.

TABLE 1

X-ray, electrical and composition data for activated carbon and carbon-based electrodes.

| Sample | SOR | $R_{sp}$ [Ω cm$^2$] | $C_{sp}$ [F/cm$^3$] | $N_2$ [wt. %] |
|---|---|---|---|---|
| Wheat flour - example 1 | 0.03 | 0.04 | 96 | 1.03 |
| Corn flour - example 2 | 0.04 | 0.02 | 97 | 1.10 |
| Resin-based - example 3† | 0.02 | 0.14 | 105 | 0.12 |
| PICA carbon - example 4† | 0.10 | 0.02 | 45 | |
| Kuraray (YP-50) - example 5† | 0.14 | 0.05 | 65 | |

†Comparative

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An activated carbon material formed from a non-lignocellulosic carbon precursor substantially free of both lignin and cellulose comprising:
   a structural order ratio (SOR) less than or equal to 0.05; and
   a nitrogen content greater than 0.2 wt. %.

2. The activated carbon material of claim 1, wherein the non-lignocellulosic carbon precursor comprises one or more of wheat flour, walnut flour, corn flour, corn starch, rice flour, and potato flour.

3. The activated carbon material of claim 1, wherein the nitrogen content is greater than 1 wt. %.

4. The activated carbon material of claim 1, wherein the activated carbon material has a volumetric capacitance greater than or equal to 70 F/cm$^3$.

5. The activated carbon material of claim 1, wherein the activated carbon material has a volumetric capacitance greater than or equal to 80 F/cm$^3$.

6. The activated carbon material of claim 1, wherein the activated carbon material has a specific surface area greater than or equal to 300 m$^2$/g.

7. The activated carbon material of claim 1, wherein the activated carbon material has a specific surface area greater than or equal to 500 m$^2$/g.

8. The activated carbon material of claim 1, wherein the activated carbon material has an area specific resistance less than or equal to 0.1 ohm-cm$^2$.

9. A composition comprising the activated carbon material of claim 1 and at least one additive.

10. The composition according to claim 9, wherein the at least one additive is a binder.

11. The composition according to claim 10, wherein the binder is PTFE.

12. The composition according to claim 9, wherein the at least one additive is an electrically conductive carbon material.

13. The composition according to claim 12, wherein the electrically conductive carbon material is carbon black.

14. A carbon-based electrode comprising the activated carbon material of claim 1 disposed on an electrically conductive substrate.

15. The carbon-based electrode according to claim 14, wherein the electrically conductive substrate comprises carbon-coated aluminum.

16. An electrochemical cell comprising the carbon-based electrode of claim 14.

17. An electrochemical cell comprising:
a first electrode comprising the activated carbon material according to claim 1;
a porous separator; and
a pair of electrically conductive substrates, wherein
the porous separator is disposed between the first electrode and a second electrode; and
the first and second electrodes are each in electrical contact with a respective electrically conductive substrate.

18. The electrochemical cell according to claim 17, wherein the second electrode comprises the activated carbon material according to claim 1.

19. The electrochemical cell according to claim 17, wherein at least one of the electrically conductive substrates comprises carbon-coated aluminum.

* * * * *